United States Patent [19]

Hall

[11] Patent Number: 5,574,601

[45] Date of Patent: Nov. 12, 1996

[54] OPTICAL BEAM EXPANDER

[75] Inventor: Peter R. Hall, Hitchin, Great Britain

[73] Assignee: British Aerospace Public Limited Company, Farnborough, England

[21] Appl. No.: 323,258

[22] Filed: Oct. 14, 1994

[30] Foreign Application Priority Data

Oct. 16, 1993 [GB] United Kingdom .................. 9321408

[51] Int. Cl.$^6$ ............................ G02B 26/08; G02B 17/00; G02B 5/08; G02B 5/10
[52] U.S. Cl. ........................ 359/859; 359/226; 359/364; 359/850; 359/853
[58] Field of Search ..................................... 359/853, 850, 359/864, 865, 868, 859, 857, 858, 867, 869, 709, 710, 711, 226

[56] References Cited

U.S. PATENT DOCUMENTS

| | | | |
|---|---|---|---|
| 3,453,425 | 7/1969 | Whitaker | 362/216 |
| 3,802,767 | 4/1974 | Rambauske | 359/853 |
| 3,892,476 | 7/1975 | Sherman et al. | 359/859 |
| 3,950,079 | 4/1976 | Rambauske | 359/226 |
| 3,963,328 | 6/1976 | Abel | 359/859 |
| 4,003,639 | 1/1977 | McFarland et al. | 359/859 |
| 4,205,902 | 6/1980 | Shafer | 359/859 |
| 4,439,012 | 3/1984 | Christy | 359/859 |
| 4,655,555 | 4/1987 | Machler et al. | 359/365 |
| 4,812,030 | 3/1989 | Pinson | 359/859 |
| 4,812,613 | 3/1989 | Gorisch | 219/121.74 |
| 4,863,253 | 9/1989 | Shafer et al. | 359/859 |
| 5,003,567 | 3/1991 | Hawryluk et al. | 371/34 |
| 5,181,145 | 1/1993 | Eden | 359/859 |
| 5,214,540 | 5/1993 | Yakimovsky | 359/858 |
| 5,274,497 | 12/1993 | Casey | 359/364 |
| 5,306,892 | 4/1994 | Hohberg | 219/121.67 |

FOREIGN PATENT DOCUMENTS

| | | |
|---|---|---|
| 46546 | 3/1982 | European Pat. Off. . |
| 96193 | 12/1983 | European Pat. Off. . |
| 0358929 | 3/1990 | European Pat. Off. . |
| 0283555 | 8/1990 | European Pat. Off. . |
| 0520326 | 1/1993 | European Pat. Off. . |
| 0365406 | 4/1990 | France . |
| 2531671 | 1/1977 | Germany . |
| 3343868 | 6/1985 | Germany . |
| 2021805 | 12/1979 | United Kingdom . |
| 2186711 | 8/1987 | United Kingdom . |

Primary Examiner—Paul M. Dzierzynski
Assistant Examiner—Mohammad Y. Sikder
Attorney, Agent, or Firm—Cushman, Darby & Cushman

[57] ABSTRACT

A beam expander suitable for use with laser machining apparatus comprises a convex paraboloidal surface 7 and a concave paraboloidal surface 8 formed from a single metal element 10. The expander has an optional zoom facility provided by a plane mirror 12, moveable along an input-output axis, for altering the position of an incident beam on the convex surface 7 thereby altering the magnification of the system.

15 Claims, 2 Drawing Sheets

OPTICAL BEAM EXPANDER

FIELD OF THE INVENTION

The invention relates to a beam expander comprising two substantially confocal, generally conic reflective surfaces for use for example to expand a laser beam for laser machinery.

BACKGROUND OF RELATED ART

EP-A-096,193 discloses a beam expander which includes two, separate confocal mirrors, a first mirror being convex and a second one being concave. These mirrors may be aspheres or other conic sections. The magnification of the beam expander disclosed therein however, cannot be varied, i.e. there is no zoom capability.

SUMMARY OF THE INVENTION

A catoptric system having a zoom capability is disclosed in U.S. Pat. No. 4,812,030. This Cassegrain arrangement achieves a variable magnification by moving the powered reflectors with respect to one another.

It is one object of this invention to provide a laser beam expander which can be machined from a single element.

It is a further object of this invention to provide a laser beam expander in which a variable magnification (or zoom facility) can be provided by a means which does not require movement of any powered optical element.

In this specification the term conic is used to denote those curves forming conic sections and the surfaces of revolution thereof, including convex and concave parabolae and convex and concave ellipses, as well as toric developments of such surfaces, and portions thereof.

According to one aspect of this invention, an optical beam expander comprises a first reflective surface of conic profile for receiving an optical beam and for reflecting it onto a confocal second reflective surface of conic profile and thence to reflect it onwards. One reflective surface is convex and the other is concave. The first and second reflective surfaces are formed on a single element.

According to a further aspect of the invention an optical beam expander comprises a first reflective surface of conic profile for receiving an optical beam and reflecting it towards a confocal second reflective surface of conic profile and thence to reflect it onwards. The system further comprises variable magnification means for adjusting the position of the received optical beam on the first reflective surface, thereby to adjust the magnification of the expander.

The variable magnification means may comprise a moveable plane mirror, for example, and the reflective surfaces may be either separate elements or may be formed on one single element.

Using this invention, beam expanders can be designed which are monolithic and machined from a single piece of metal, giving great advantages in stability of beam direction, in stability of collimation, and in having good heat sinking capabilities.

Known optical systems which change the focal length or magnification as the result of dioptric lenses or mirrors (or both) moving relative to each other have some disadvantages. For example, it is only possible to achieve true zoom stability of aberrations for a limited number of points during the zoom process; that is, at a set of specific magnifications. At other magnifications there is a small increase or instability of aberration. This invention considerably reduces this difficulty.

BRIEF DESCRIPTION OF THE DRAWINGS

Some embodiments of the invention will now be described by way of example only, with reference being made to the accompanying drawings, in which.

DESCRIPTION OF PREFERRED EMBODIMENTS

Figure 1:
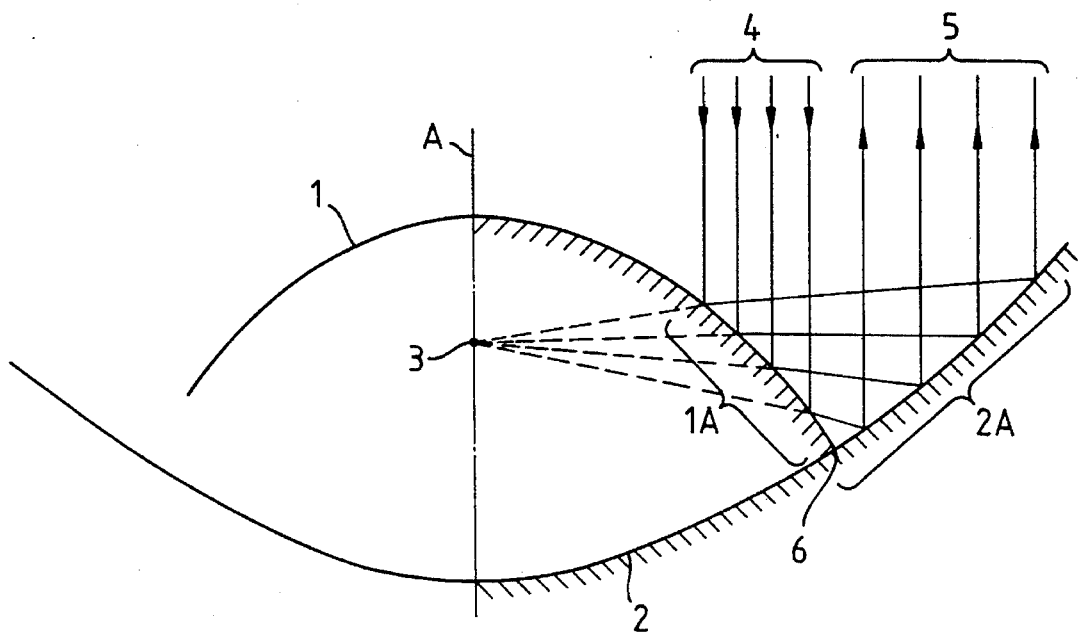
FIG. 1 is a schematic diagram of an optical apparatus illustrating a first embodiment of this invention.

In FIG. 1 a convex paraboloidal reflector 1 and a concave paraboloidal reflector 2 have a common focal point 3. An input beam 4 travelling in a direction parallel to the axis of symmetry 'A' of the apparatus, is reflected firstly off the convex reflector 1 and thence off the concave reflector 2 to emerge as an expanded, collimated beam 5. The emerging beam 5 travels parallel to the input beam 4, but in the opposite direction. It will be noted from inspection of FIG. 1 that the optical path through the apparatus does not pass through the focal point 3.

Although the input beam 4 is corrected for collimation, the system of FIG. 1 suffers from a large offence again Sine Condition, and this feature is used for advantage in the variable magnification expander to be described below.

A beam expander of the type illustrated in FIG. 1 can be fabricated from a single metal element by diamond turning techniques, and consists of just those regions of the paraboloidal surfaces which are required to reflect the beam, i.e., the regions designated 1A and 2A in FIG. 1.

Detailed examination of the region of the intersection 6 of the convex reflector 1 and the concave reflector 2 of FIG. 1 shows that very close to the intersection 6, incidence beams exit with substantially the same diameter as when they entered. The farther away from the intersection 6 the rays enter, the greater is the ratio between their spacing in entrance and exit apertures. While the expansion ratio changes across the surface, the rate of change can be arranged to be sufficiently small so as not to affect the light distribution of the beam.

It has been noted that the beam expander of FIG. 1 suffers from controlled amounts of Offence against Sine-Condition. This means that if the input beam is moved across the input surface, while remaining parallel to the axis of rotational symmetry, the output beam will alter in diameter to provide a zoom system. In contrast to known systems, the advantage is that this is true for all input positions.

Figure 2:
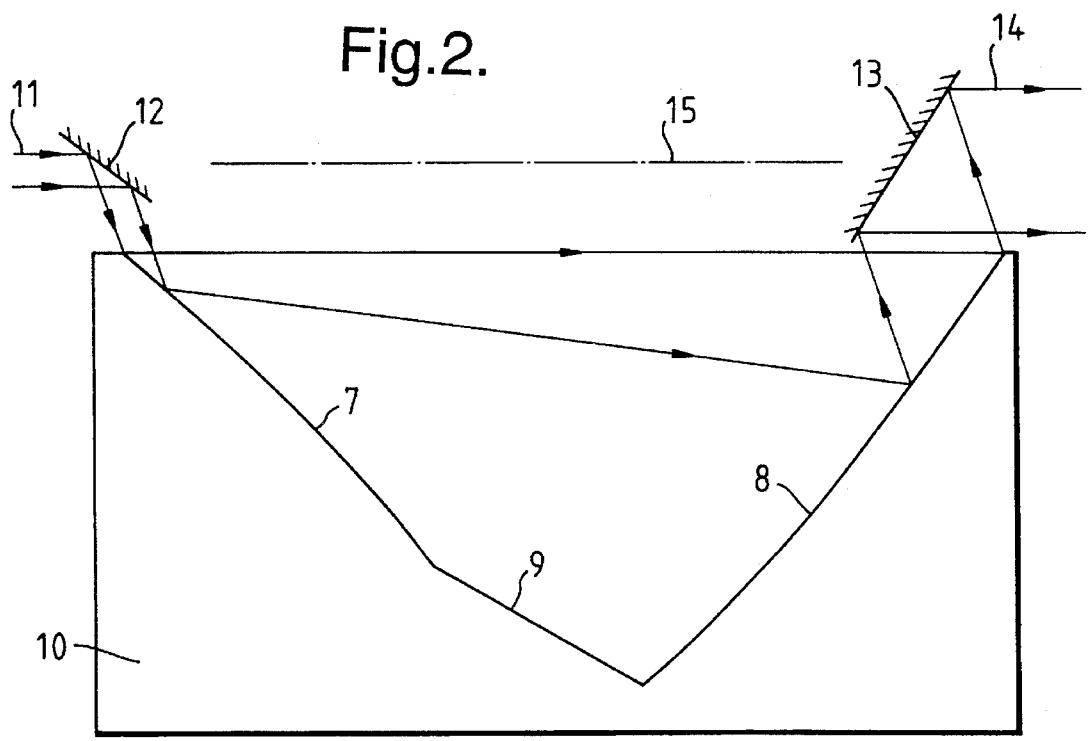
FIG. 2 is a schematic diagram of an optical apparatus illustrating a second embodiment of this invention, which provides a zoom facility.

Referring then to FIG. 2 this embodiment comprises a convex paraboloidal surface 7 and a confocal concave paraboloidal surface 8 joined to the convex surface by an intermediate section 9. The two surfaces 7, 8 and the intermediate section 9 are formed from one piece of metal 10 by, for example, a single diamond point turning lathe. This provides a monolithic structure making it easier to achieve uniformity of alignment and focusing in the presence of thermal expansion. The intermediate section 9 provides a locally thickened section which provides enhanced heat transfer between the reflecting surfaces 7 and 8.

An incoming beam directed along an input path 11 is deflected by a first plane mirror 12 to be incident on the convex paraboloidal surface 7 at a selected position thereon and in a direction parallel to the axis of rotational symmetry of the apparatus. The beam is reflected onto the second, concave surface 8 and thence onto a second plane mirror 13 to exit along a path 14 co-linear with the input path 11 and an input/output axis 15.

The plane mirrors 12, 13 are mounted for movement towards and away from each other along the input/output axis 15, by suitable mechanical or electromechanical arrangements (not shown) to adjust the position of incidence of the input beam on the convex paraboloidal mirror 7 and to pick up the beam reflected off the concave paraboloidal mirror 8. In the position shown in FIG. 2, approximately ×4 magnification is provided. The magnification factor reduces to about 1.5× as the plane mirrors 12, 13 move towards each other. The upper value of the magnification is limited only by the size of the machines on which such components are made. The lower limit is set by an arbitrary need to prevent the input and output folding mirrors from clashing at their point of closest approach (near ×1).

The arrangements described above have several advantages. Both dioptric surfaces face in the same direction and are concentric with the same optical axis. Thus they can be manufactured at the same time and this permits greater accuracy of alignment of the two surfaces relative to each other. Accuracy of alignment is important for achieving perfect performance. A monolithic structure means that subsequent motion of the two paraboloidal surfaces relative to each other is negligible, creating improved long term stability.

Particularly in the case of the variable magnification expander of FIG. 2, since the system returns the beam parallel to its input direction, only two plane mirrors are required, in a particularly compact arrangement, to achieve co-linearity of input 11 and exit 14 beams. The arrangement allows for the design of compact zoom systems with very few components, and good on-axis correction with correction at all magnifications, thus resulting in improved performance, lower cost and smaller size. Furthermore, the system produces much simpler zoom configurations. Many known zoom configurations require lenses instead of mirrors, and these result in much higher costs and also much lower power handling capabilities.

FIGS. 3–6 inclusive show further variants of a beam expander in accordance with the invention.

Figure 3:
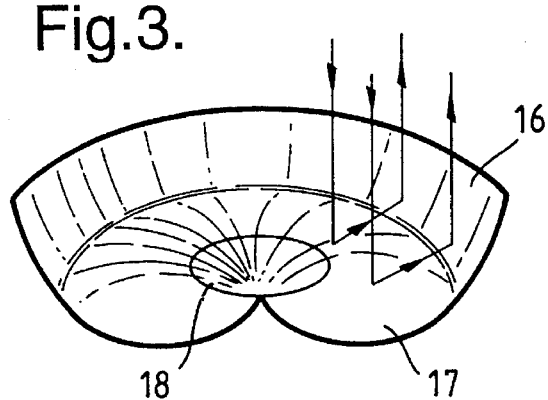
FIG. 3 is a schematic diagram showing a transverse cross-section of a third embodiment of this invention, including two toric parabolic reflectors.

In FIG. 3, a concave toric paraboloid reflector 16 and a convex toric paraboloid reflector 17 are arranged with their respective circular loci of focus 18 co-linear with each other and their toric generatrices. A collimated beam is incident on the convex surface 17 and reflected on to the concave surface 16 where it is re-collimated and reflected in a direction opposite and parallel to the direction of the incoming beam. In this arrangement, the curvature in both sagittal and tangential sections may be different, to allow different magnification in each section, thereby anamorphosing the aperture.

Figure 4:
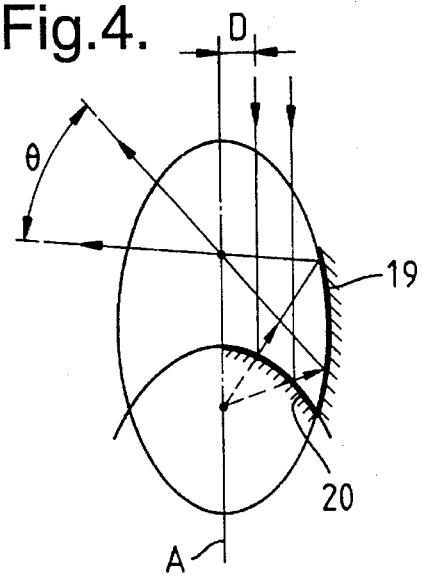
FIG. 4 is a schematic diagram of a fourth embodiment of this invention, including a concave ellipsoidal reflector and a convex paraboloidal reflector.
Figure 5:
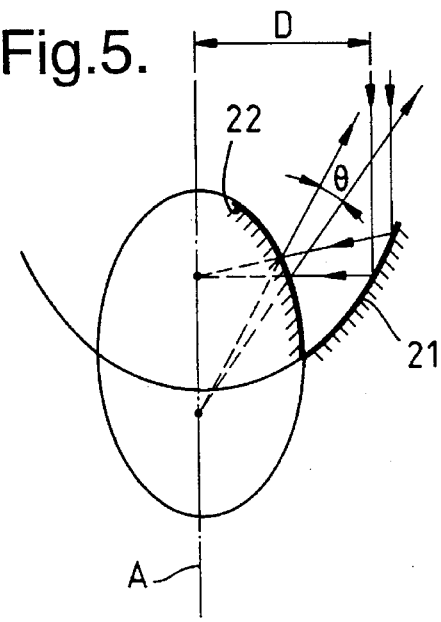
FIG. 5 is a schematic diagram of a fifth embodiment of this invention, including a concave paraboloidal reflector and a convex ellipsoidal reflector.

The embodiments of FIGS. 4 and 5 provide systems which transform a collimated input into a focused output. Thus in FIG. 4, a concave ellipsoidal surface 19 and a convex paraboloid surface 20 are arranged so that the focus of the convex surface 20 is co-incident with one of the foci of the concave surface 19. Collimated incoming rays are reflected divergently by the convex surface 20 and are focused by the concave ellipsoidal surface 19 onto the non-common focus of the ellipsoid 19. The divergence θ of the output rays is proportional to the offset D of the input beam from the optical axis A.

In FIG. 5, a concave paraboloid surface 21 and a convex ellipsoidal surface 22 are arranged so that the focus of the concave surface 21 is co-incident with one of the foci of the convex surface 22. Incoming collimated rays are this time reflected from the concave surface 21 onto the convex surface 22 to emerge as a diverging beam. Again the offset D of the incoming rays from the optical axis A, is related to the divergence θ.

Figure 6:
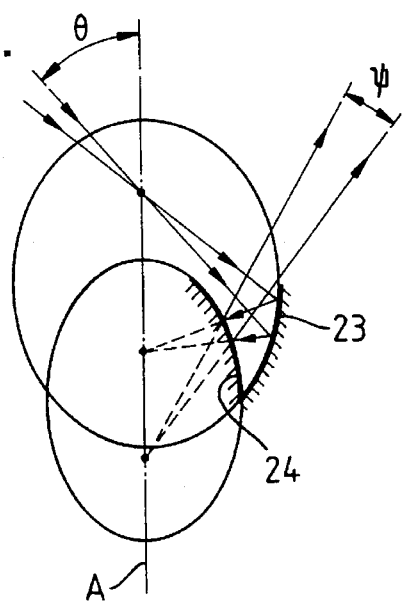
FIG. 6 is a schematic diagram of a sixth embodiment of this invention, including a convex and a concave ellipsoidal reflector.

In FIG. 6, a concave ellipsoidal surface 23 has one focus co-incident with one of the foci of a convex ellipsoidal surface 24. Incoming rays at an angle θ to the optical axis A and converging through a focus of the concave surface 23 are reflected from the concave 23 and convex 24 surfaces to emerge with an angle of divergence ψ proportional to angle θ.

I claim:

1. An optical beam expander comprising:

a first reflective surface of conic profile; and a second reflective surface of conic profile and arranged to be confocal with said first reflective surface;

one of said first reflective surface and said second reflective surface being convex and the other of said first reflective surface and said second reflective surface being concave;

at least one of said first reflective surface and said second reflective surface being paraboloidal; and said first reflective surface and said second reflective surface being included on a single element.

2. An optical beam expander comprising:

a first reflective surface of conic profile;

a second reflective surface of conic profile and arranged to be confocal with said first reflective surface; and a third reflecting surface for adjusting a position of an optical beam of radiation on said first reflective surface, said adjustment thereby varying a magnification of said optical beam expander;

one of said first reflective surface and said second reflective surface being convex and the other of said first reflective surface and said second reflective surface being concave;

at least one of said reflective surface and said second reflective surface being paraboloidal; and said first reflective surface and said second reflective surface being included on a single element.

3. An optical beam expander according to claim 1, further comprising:

a third reflecting surface for adjusting a position of an optical beam of radiation on said first reflective surface, said adjustment thereby varying a magnification of said optical beam expander.

4. An optical beam expander according to claim 1, wherein said single element further includes:

an intermediate region adjacent to said first reflective surface and to said second reflective surface, said intermediate region being of increased cross-sectional area in order to enhance heat transfer through said single element.

5. An optical beam expander according to claim 2, wherein:

said third reflecting surface comprises a moveable plane mirror.

6. An optical beam expander according to claim 3, wherein:

said third reflecting surface comprises a moveable plane mirror.

7. A beam expander according to claim 1, wherein:

said first reflective surface is a convex paraboloidal surface; and said second reflective surface is a concave paraboloidal surface.

8. A beam expander according to claim 1, wherein:

said first reflective surface is a convex toric paraboloid; and said second reflective surface is a concave toric paraboloid concentric with said first reflective surface.

9. A beam expander according to claim 8, wherein:

curvatures of said first reflective surface and said second reflective surface in respective tangential and sagittal sections differ, thereby providing different magnifications.

10. A beam expander according to claim 1, wherein:

one of said first reflective surface and said second reflective surface is paraboloidal and the other of said first reflective surface and said second reflective surface is ellipsoidal.

11. A beam expander according to claim 2, wherein:

said first reflective surface is a convex paraboloidal surface; and said second reflective surface is a concave paraboloidal surface.

12. A beam expander according to claim 2, wherein:

said first reflective surface is a convex toric paraboloid; and said second reflective surface is a concave toric paraboloid concentric with said first reflective surface.

13. A beam expander according to claim 12, wherein:

curvatures of said first reflective surface and said second reflective surface in tangential and sagittal sections differ, thereby providing different magnifications.

14. A beam expander according to claim 2, wherein:

one of said first reflective surface and said second reflective surface is paraboloidal and the other of said first reflective surface and said second reflective surface is ellipsoidal.

15. A beam expander according to claim 2, wherein:

each of said first reflective surface and said second reflective surface is ellipsoidal.

* * * * *